United States Patent
Oowatari

(10) Patent No.: US 9,837,879 B2
(45) Date of Patent: Dec. 5, 2017

(54) ROTATING ELECTRICAL MACHINE

(71) Applicant: DENSO CORPORATION, Kariya, Aichi-pref. (JP)

(72) Inventor: Shinya Oowatari, Anjo (JP)

(73) Assignee: DENSO CORPORATION, Kariya (JP)

( * ) Notice: Subject to any disclaimer, the term of this patent is extended or adjusted under 35 U.S.C. 154(b) by 255 days.

(21) Appl. No.: 14/844,546

(22) Filed: Sep. 3, 2015

(65) Prior Publication Data

US 2016/0072369 A1 Mar. 10, 2016

(30) Foreign Application Priority Data

Sep. 8, 2014 (JP) ................................ 2014-182348

(51) Int. Cl.
| | |
|---|---|
| *H02K 9/00* | (2006.01) |
| *H02K 11/04* | (2016.01) |
| *H02K 9/02* | (2006.01) |
| *H02K 9/06* | (2006.01) |

(52) U.S. Cl.
CPC ............. *H02K 11/048* (2013.01); *H02K 9/02* (2013.01); *H02K 9/06* (2013.01)

(58) Field of Classification Search
CPC .... H02K 11/046; H02K 11/048; H02K 5/225; H02K 5/18; H02K 11/04; H02K 9/02
USPC ........................... 310/59, 68 D, 68 B, 71, 64
See application file for complete search history.

(56) References Cited

U.S. PATENT DOCUMENTS

| | | | | |
|---|---|---|---|---|
| 5,751,079 | A * | 5/1998 | Bagherpour | H02K 9/06 310/59 |
| 6,198,187 | B1 * | 3/2001 | Asao | H02K 9/06 310/68 D |
| 7,545,061 | B2 * | 6/2009 | Asao | H02K 9/06 310/58 |
| 2001/0026102 | A1 * | 10/2001 | Asao | H02K 9/06 310/59 |
| 2007/0257568 | A1 * | 11/2007 | Akita | H02K 11/048 310/64 |
| 2013/0320786 | A1 * | 12/2013 | Isoda | H02K 9/06 310/59 |

FOREIGN PATENT DOCUMENTS

JP 5373936 B1 12/2013

* cited by examiner

*Primary Examiner* — Thanh Lam
(74) *Attorney, Agent, or Firm* — Oliff PLC

(57) ABSTRACT

A rotating shaft is attached rotatably to a front body and a rear body of an AC generator. Feeding brushes are disposed around a rear end portion of the rotating shaft. A heat radiating plate is attached to a rear end of the rear body. A control board is attached to a back of the heat radiating plate. External air flows in from an air inlet and advances in a radially inward direction after passing through a cooling fin disposed on the heat radiating plate by a first air flow passage. In addition, the external air passes through and around the rear end portion of the rotating shaft after flowing into a rear surface side of the heat radiating plate via a second air passage.

9 Claims, 5 Drawing Sheets

ROTATING ELECTRICAL MACHINE

CROSS-REFERENCE TO RELATED APPLICATION

This application is based on and claims the benefit of priority from earlier Japanese Patent Application No. 2014-182348 filed Sep. 8, 2014, the description of which is incorporated herein by reference.

TECHNICAL FIELD

The present disclosure relates to a rotating electrical machine that generates electrical power by rotation of a rotor, or in which the rotor is rotated by a supply of the electrical power.

BACKGROUND

A generator generates electrical power by rotation of a rotor disposed in a housing with a stator that is disposed so as to face the rotor.

Some generators use a power converter having a power element in order to convert the power generated into direct current (DC).

In addition, even in a motor of which a rotor is rotated by being supplied with the power, there are motors that have a power converter in a housing in order to convert the power supplied to a stator into alternating current (AC).

In such a generator and a motor, since power elements included in the power converter generate heat due to their operation, there is a problem that heat is retained in the housing.

Moreover, there are heat-generating components such as brushes for supplying power to a rotor coil or a rotation sensor for detecting a rotational position of the rotor in the generator or the motor in addition to the power converter.

In response to this, there is a conventional technology regarding a rotating electrical machine equipped with a cooling function of a power converter, brushes, and a rotation sensor (refer to Japanese Patent Publication No. 5373936, for example).

In the rotating electrical machine according to the conventional technology, a first cooling air that is taken from external air is flowed into the rotating electrical machine from a radially outward direction for cooling the power converter, and a second cooling air that is external air is flowed in an axial direction from a rear of the rotating electrical machine for cooling the brushes and the rotation sensor are provided.

Thereby, the power converter, the brushes, and the rotation sensor can be individually cooled, so that it is possible to reduce the retention of heat in the housing.

Meanwhile, when an axial-type magnetic rotation sensor (magnetic pole angle sensor) is used as a rotation sensor for detecting a rotational position of the rotor, the rotary sensor is placed in a center of a control board so as to face a magnetic pole disposed in a rotating shaft.

However, in the rotating electrical machine having a cooling function according to the conventional technology described above, an inlet hole of the cooling air must be formed in the center of the control board disposed at a rear end in order to provide the second cooling air flowing in the axial direction from behind.

Therefore, in this case, it is inevitably difficult for the rotation sensor and the inlet hole of the cooling air to coexist on the control board.

SUMMARY

An embodiment provides a rotating electrical machine capable of improving a coolability of heat generating portions.

A rotating electrical machine according to a first aspect includes a housing, a stator fixed to the housing, a rotating shaft attached rotatable relative to the housing, a rotor, fixed to the rotating shaft which faces the stator in a radial direction, a feeding brush attached to the housing for supplying power to the rotor by slide-contacting against a slip ring disposed on a first end portion of the rotating shaft, and a power conversion element that converts power generated in the stator into direct current or converts the power supplied to the stator into alternating current.

The rotating electrical machine further includes a flat-plate shaped heat radiating member having a first surface and a second surface, the first surface is disposed closer to the first end portion side of the rotating shaft than to the housing so as to face the housing, heat radiation fins being formed on the first surface, and the power conversion element being attached to the second surface.

The rotating electrical machine further includes a control board disposed on the second surface side of the heat radiating member, a rotation sensor attached to the control board that faces a magnetic pole that is disposed in the first end portion of the rotating shaft, and a rear cover disposed at a position sandwiching the control board together with the heat radiating member so as to cover the control board, and an outer periphery of the rear cover faces an outer peripheral surface of the housing in an axial direction with a predetermined space therebetween.

There is formed a first air passage that enables external air to flow in from between the housing and the rear cover and to advance in a radially inward direction after passing through the heat radiation fins, and a second air passage that enables the external air to pass through and around the first end portion of the rotating shaft after flowing into the second surface side of the heat radiating member from a radially outward direction.

According to the above configuration, the first air passage that enables external air to flow in from between the housing and the rear cover and to advance in a radially inward direction after passing through the heat radiation fins, and the second air passage that enables the external air to pass through and around the first end portion of the rotating shaft after flowing into the second surface side of the heat radiating member from a radially outward direction are formed.

Thereby, since the external air flows into the rotating electrical machine from the radially outward direction by the first air passage and the second air passage, the power conversion element, the feeding brushes, and the rotation sensor can be cooled sufficiently by the cooling air from both air passages.

Since the first air passage and the second air passage let the cooling air flow into the rotating electrical machine from the radially outward direction, there is no need to form an inlet hole to the control board, and it becomes possible to dispose the rotation sensor in the center of the control board.

DETAILED DESCRIPTION OF THE PREFERRED EMBODIMENTS

First Embodiment

An AC generator 1 (which corresponds to a rotating electrical machine) according to a first embodiment of the present disclosure will be described with reference to FIGS. 1 and 2.

Although the AC generator 1 in the present embodiment constitutes a power generating system provided in a vehicle, it is not limited thereto.

Note that in a description of the AC generator 1, a direction where a rotating shaft 6 to which a rotor 8 is mounted extends is referred to simply as an axial direction.

In addition, a side in the axial direction where a pulley 10 is disposed (leftward in FIG. 2) is referred to as a front of the AC generator 1 (corresponds to a second end side of the rotating shaft), and an opposite side (rightward in FIG. 2) is referred to as a rear of the AC generator 1 (corresponds to a first end side of the rotating shaft).

Moreover, a direction reaching toward the rotating shaft 6 from an outer periphery of the AC generator 1 is referred to as a radially inward direction, and a direction opposite to it is referred to as a radially outward direction.

Figure 1:
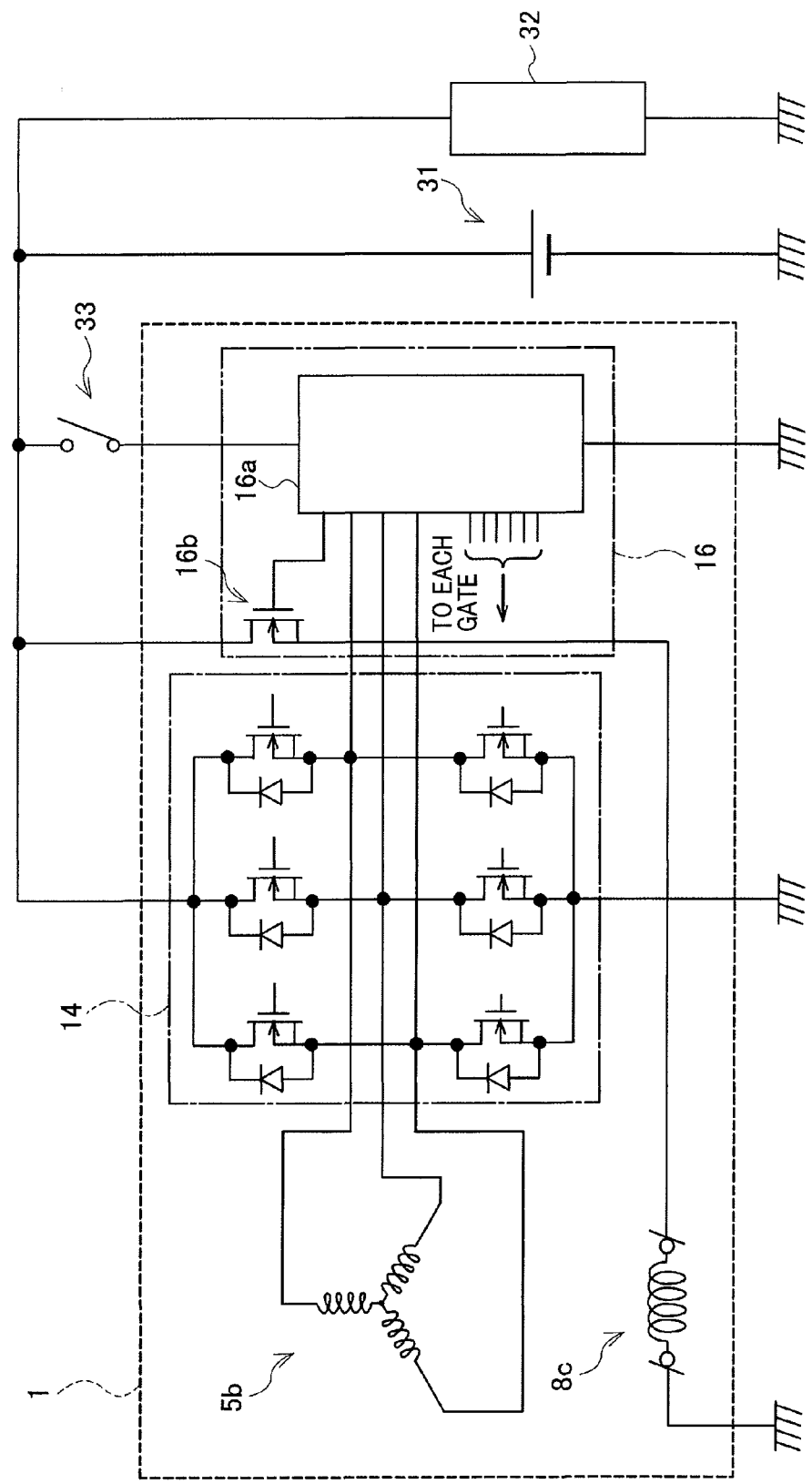
FIG. 1 shows a circuit diagram of a power generating system for a vehicle including an AC generator according to a first embodiment of the present disclosure.

As shown in FIG. 1, in a power generating system for a vehicle includes the AC generator 1, vehicle loads 32 including an air conditioner, an onboard audio, head lamps or the like are connected to a DC power source (onboard battery) 31.

The vehicle loads 32 are operated by consuming power supplied from the DC power source 31.

A control circuit 16*a* of the AC generator 1 is connected to a positive electrode side of the DC power source 31 via a starting switch 33.

The starting switch 33 is a switching device in conjunction with an ignition switch (not shown) of the vehicle.

The control circuit 16*a* is a control device composed of an input/output device, a CPU, a RAM, a microcomputer or the like (all are not shown).

A gate terminal of a rotor switch 16*b* is connected to the control circuit 16*a*.

The rotor switch 16*b* is a switching element formed by a MOS-FET (Metal-oxide-semiconductor field effect-transistor), and the positive electrode side of the DC power source 31 is connected to a drain terminal of the rotor switch 16*b* as well as a field coil 8*c* of a rotor 8, which will be described later, is connected to a source terminal of the rotor switch 16*b*.

The control circuit 16*a* and the rotor switch 16*b* are included in a control board 16 which will be described later. In addition, the positive electrode side of the DC power source 31 is connected to a power module 14 (corresponds to a power conversion element).

The power module 14 is formed by a plurality of power MOS transistors, though it is not limited to this.

The power module 14 converts electric power generated in a stator 5, which will be described later, into direct current (DC), or converts electric power supplied from the DC power source 31 to the stator 5 into to alternating-current (AC).

Each gate terminal of the power MOS transistors included in the power module 14 is connected to the control circuit 16*a* mentioned above.

In addition, a stator coil 5*b*, which will be described later, is connected the power module 14.

The rotor switch 16*b* and the power module 14 mentioned above are operated and controlled by the control circuit 16*a*.

Figure 2:
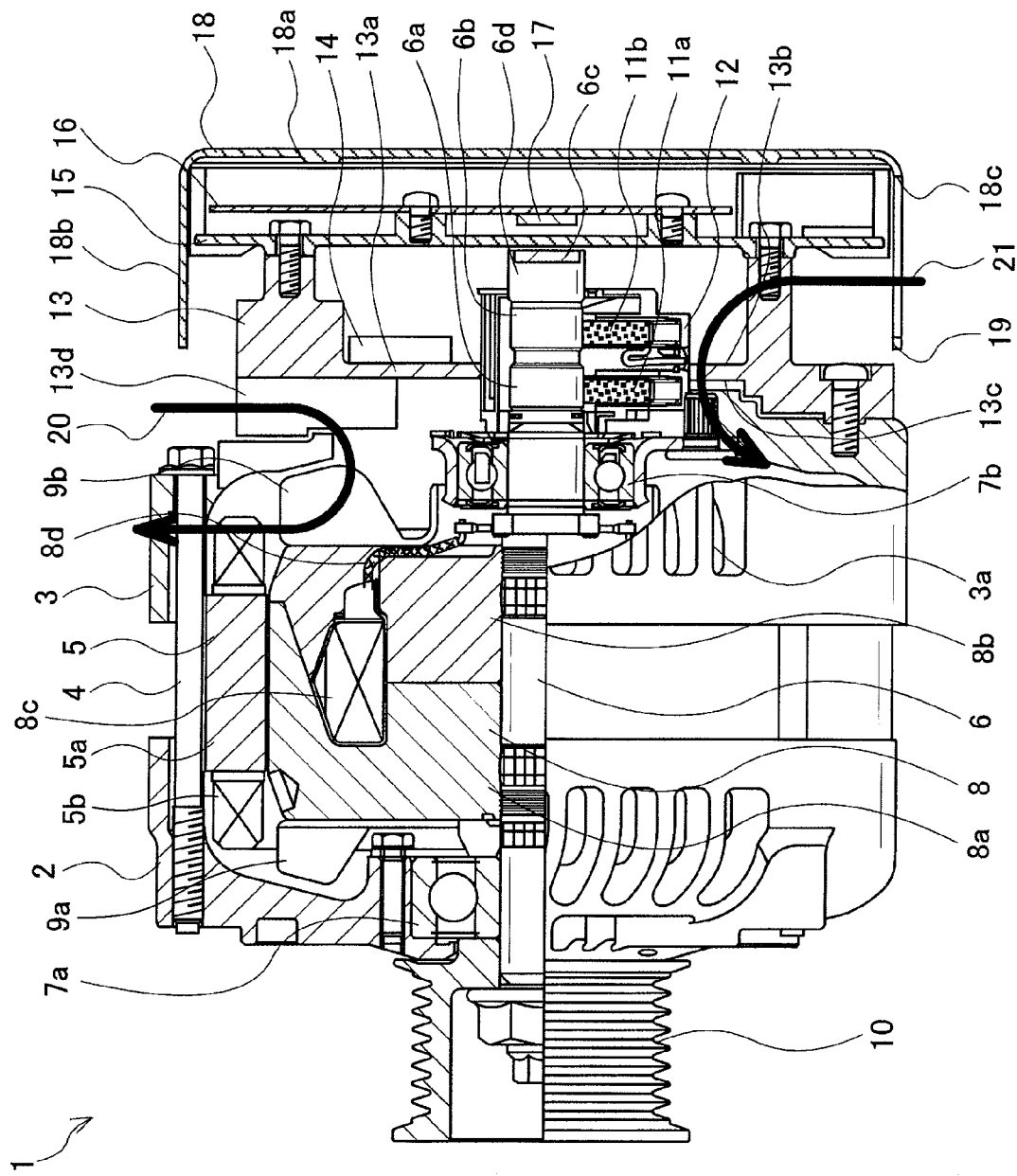
FIG. 2 shows a sectional view cut along a rotating shaft of the AC generator shown in FIG. 1.

As shown in FIG. 2, in the AC generator 1, a front body 2 and a rear body 3 are connected by tie bolts 4 in a condition where the stator 5 is sandwiched therebetween in the axial direction.

A plurality of exhaust ports 3*a* that communicate inside and outside of the AC generator 1 are formed on an outer peripheral surface of the rear body 3.

A configuration that includes the front body 2 and rear body 3 corresponds to a housing.

The stator 5 includes a stator core 5*a* fixed to the front body 2 and rear body 3, and a stator coil 5*b* wound around the stator core 5*a*.

On the other hand, the rotating shaft 6 is rotatably attached to the front body 2 and rear body 3 by bearings 7*a*, 7*b*.

The rotor 8 is fixed to the rotating shaft 6.

The rotating shaft 6 is press-fitted into a pair of rotor cores 8*a*, 8*b* that form the rotor 8.

The rotor cores 8*a*, 8*b* are coupled to each other by sandwiching a field coil 8*c* therebetween.

The rotor 8 faces to the stator 5 in a radially inward direction, and a slight gap is formed between outer peripheral surfaces of the rotor cores 8*a*, 8*b* and an inner circumferential surface of the stator core 5*a* (shown in FIG. 2).

Further, a front cooling fan 9*a* is fixed to a front end surface of the rotor core 8*a* disposed in the front, and a rear cooling fan 9*b* is fixed to a rear end surface of the rotor core 8*b* disposed in the rear.

The front cooling fan 9*a* and the rear cooling fan 9*b* are disposed rotatable integrally with the rotor 8.

Furthermore, a pulley 10 is mounted integrally rotatable in a front end portion of the rotating shaft 6.

A belt (not shown) for transmitting driving force from an engine of a vehicle (not shown) is tensioned between the engine and the pulley 10.

A pair of slip rings 6*a*, 6*b* are formed around an entire circumference of a rear end portion (corresponds to a first end portion) of the rotating shaft 6.

A wire harness 8*d* of the rotor 8 is connected to respective slip rings 6*a*, 6*b*, and the slip rings 6*a*, 6*b* are connected to the field coil 8*c* described above by the wire harness 8*d*.

As shown in FIG. 2, a pair of feeding brushes 11*a*, 11*b* abut respectively to the slip rings 6*a*, 6*b*.

The feeding brushes 11*a*, 11*b* are attached to the rear body 3 via a brush holder 12 formed of a synthetic resin material.

The feeding brushes 11*a*, 11*b* are connected to the DC power source 31 of the vehicle described above, and the DC power source 31 energizes the field coil 8*c* via the feeding brushes 11*a*, 11*b*, the slip rings 6*a*, 6*b*, and the wire harness 8*d*.

The feeding brushes 11a, 11b slide-contact against the slip rings 6a, 6b by the rotor 8 rotating, to supply power to the field coil 8c.

Furthermore, a sensor pole 6c (corresponds to a magnetic pole) is formed in the rear end portion of the rotating shaft 6, and the sensor pole 6c has a plurality of magnetic poles.

The sensor pole 6c is held on the rotating shaft 6 through a magnet holder 6d formed by a non-magnetic material.

A heat radiating plate 13 (corresponds to a heat radiating member) is disposed at a rear end side farther than the rear body 3 of the rotating shaft 6.

The heat radiating plate 13 is integrally molded by a material with an excellent thermal conductivity such as an aluminum alloy, and is formed in a substantially flat plate shape.

The heat radiating plate 13 is provided with a flat bottom surface portion 13a extending in a radial direction.

The heat radiating plate 13 is attached to the outer peripheral surface of rear body 3 so that a first surface 13c of the bottom surface portion 13a (hereinafter, referred to as a front surface 13c) faces the front so as to face a rear end portion of the rear body 3, and a second surface 13b (hereinafter, referred to as a rear surface 13b) faces the rear.

The heat radiating plate 13 is formed in a substantially C-shape so that the rotating shaft 6 can penetrate a central section thereof, and surrounds the rotating shaft 6 and the feeding brushes 11a, 11b in the radially outward direction.

A plurality of cooling fins 13d (correspond to heat radiation fins) are formed on the front surface 13c of the bottom surface portion 13a.

The cooling fins 13d protrude toward the front in the axial direction from the front surface 13c of the bottom surface portion 13a.

The cooling fins 13d extend radially in the radial direction on the bottom surface portion 13a.

Further, the power module 14 described above is attached on the rear surface 13b of the bottom surface portion 13a.

The power module 14 is mounted in a form that is divided into a plurality of pieces on the rear surface 13b of the heat radiating plate 13.

A board case 15 is attached to the rear surface 13b of the heat radiating plate 13.

The board case 15 is integrally formed into a container shape and uses a synthetic resin material.

The control board 16 is attached to the board case 15 so as to be positioned in the rear.

In other words, the control board 16 is disposed on the rear surface 13b side (corresponds to a second surface side) of the heat radiation plate 13 through the board case 15.

The control board 16 is formed by disposing patterned wirings (not shown) of copper foils or the like on a base material to which an insulating resin is impregnated.

A plurality of electronic components including the control circuit 16a and the rotor switch 16b shown in FIG. 1 are disposed on the control board 16.

Further, a rotation sensor 17 is disposed on the control board 16.

The rotation sensor 17 is formed by a magneto-electric conversion element such as a Hall IC, and faces to the sensor pole 6c described above in the axial direction.

The rotation sensor 17 detects a magnetic flux change due to a rotation of the rotating shaft 6, and detects a rotation angle, a rotational speed, a rotational acceleration or the like of the rotor 8.

A rear end cover 18 (corresponds to a rear cover) is attached a rear end surface of the rear body 3.

The rear end cover 18 is disposed at a position sandwiching the control board 16 together with the heat radiating plate 13.

The rear end cover 18 is formed in a vessel shape by a synthetic resin material, and includes a flat portion 18a that faces the control board 16, and a cylindrical portion 18b connected with the flat portion 18a and extends forwardly at an outer periphery.

The rear end cover 18 is attached to the rear body 3 so as to cover the control board 16, the slip rings 6a, 6b, and the feeding brushes 11a, 11b between the rear body 3.

A plurality of air inlet holes 18c penetrating in the radial direction are formed on the cylindrical portion 18b of the rear end cover 18.

Further, a front end of the cylindrical portion 18b and the rear end surface of the rear body 3 face each other in the axial direction, and an air inlet 19 (corresponds to a predetermined space) is formed between the two over the entire circumferences.

The air inlet 19 communicates between the inside and the outside of the AC generator 1 through a space between the rear end cover 18 and the rear body 3.

As shown in FIG. 2, the feeding brushes 11a, 11b and the sensor pole 6c are positioned in the front of the air inlet holes 18c in the axial direction.

Note that the rear end cover 18 may be attached to the heat radiation plate 13.

Next, operation of the AC generator 1 will be described.

When the rotor switch 16b is turned on by being controlled by the control circuit 16a, power is applied from the DC power source 31 to the field coil 8c.

In this condition, when the rotor 8 is rotated by the engine via the pulley 10, an AC power is generated in the stator coil 5b.

The power generated in the stator coil 5b is converted to direct current by the power module 14 that is controlled by the control circuit 16a.

The power converted into direct current is stored in the DC power source 31 after being adjusted to a proper voltage by an IC regulator, if necessary.

When the rear cooling fan 9b is rotated by the rotor 8 being driven, external air (hereinafter, referred to as cooling air) flows into an interior of the AC generator 1 from the air inlet 19.

The cooling air passes through the cooling fins 13d of the heat radiation plate 13, and after flows into the radially inward direction, advances to the front (corresponds to a second end direction of the rotating shaft).

After flowing into the rear body 3, the cooling air cools the stator coil 5b and discharged to the outside from the exhaust ports 3a of the rear body 3 (a first air passage 20).

When the cooling air flowing in from the air inlet 19 passes through the heat radiating plate 13 along the cooling fins 13d, the heat generated by the power module 14 is released.

In addition, when the rear cooling fan 9b is rotated by the rotor 8 being driven, the cooling air flows into the interior of the AC generator 1 from the air inlet holes 18c of the rear end cover 18.

After flowing into the rear surface 13b side of the heat radiating plate 13, the cooling air then passes around the brush holder 12 and the rear end portion of the rotating shaft 6 (corresponds to around the first end portion), and advances to the front.

After flowing into the rear body 3, the cooling air cools the stator coil 5b similarly to the cooling air passing through the first air passage 20, and is discharged to the outside from the exhaust port 3a (a second air passage 21).

When the cooling air flowing in from the air inlet holes 18c is passing around the brush holder 12 and the rear end of the rotating shaft 6, the heat radiation is promoted from the feeding brushes 11a, 11b, the rotation sensor 17, and the sensor pole 6c.

According to the present embodiment, the first air passage 20 that enables the cooling air to flow in from the air inlet 19 between the rear body 3 and the end cover 18 and to advance in the radially inward direction after passing through the cooling fins 13d, and the second air passage 21 that enables the cooling air to pass through the periphery of the rear end of the rotating shaft 6 after flowing into the rear surface 13b side of the heat radiating plate 13 from the radially outward direction are provided.

Thereby, since the cooling air flows into the AC generator 1 from the radially outward direction via the first air passage 20 and the second air passage 21, the power module 14, the feeding brushes 11a, 11b, and the rotation sensor 17 can be cooled sufficiently by the cooling air from both air passages.

Since the first air passage 20 and the second air passage 21 let the cooling air flow into the AC generator 1 from the radially outward direction, there is no need to form an inlet hole to the control board 16, and it becomes possible to dispose the rotation sensor 17 in the center of the control board 16.

Further, since the first air passage 20 for cooling the power module 14 and the second air passage 21 for cooling the feeding brushes 11a, 11b and the rotation sensor 17 are disposed independently from each other, the air of which the temperature is raised by cooling the power module 14 will never flow around the feeding brushes 11a, 11b and the rotation sensor 17, it becomes possible to cool the feeding brushes 11a, 11b and the rotation sensor 17 adequately.

Further, in the first air passage 20 and the second air passage 21, after flowing in the radially inward direction, the cooling air advances toward the front end portion of the rotating shaft 6, and is discharged to the outside from the exhaust port 3a disposed in the rear body 3.

Thus, it becomes possible to cool the stator coil 5b in addition to the power module 14, the feeding brushes 11a, 11b, and the rotation sensor 17 by the cooling air flowing along the first air passage 20 or the second air passage 21.

In addition, the rear end cover 18 includes the flat portion 18a that faces the control board 16, and the cylindrical portion 18b connected with the flat portion 18a and extends forwardly. The air inlet holes 18c penetrating in the radial direction are formed on the cylindrical portion 18b.

Thus, it is possible to reliably supply the cooling air flowing along the second air passage 21 through the air inlet holes 18c into the AC generator 1, and it is possible to improve the coolability of the feeding brushes 11a, 11b and the rotation sensor 17.

Moreover, in the second air passage 21, after flowing in the radially inward direction, the external air advances toward the front in the axial direction, and is discharged to the outside from the exhaust port 3a disposed in the rear body 3.

Since the feeding brushes 11a, 11b and the sensor pole 6c are positioned in the front in the axial direction of the air inlet holes 18c, the cooling air flowing along the second air passage 21 can be reliably passed around the brush holder 12 and the rear end of the rotating shaft 6, it is possible to improve the coolability of the feeding brushes 11a, 11b and the rotation sensor 17.

Second Embodiment

With respect to an AC generator 1A according to the second embodiment, differences from the AC generator 1 according to the first embodiment will be described with reference to FIGS. 3 to 7.

Figure 3:
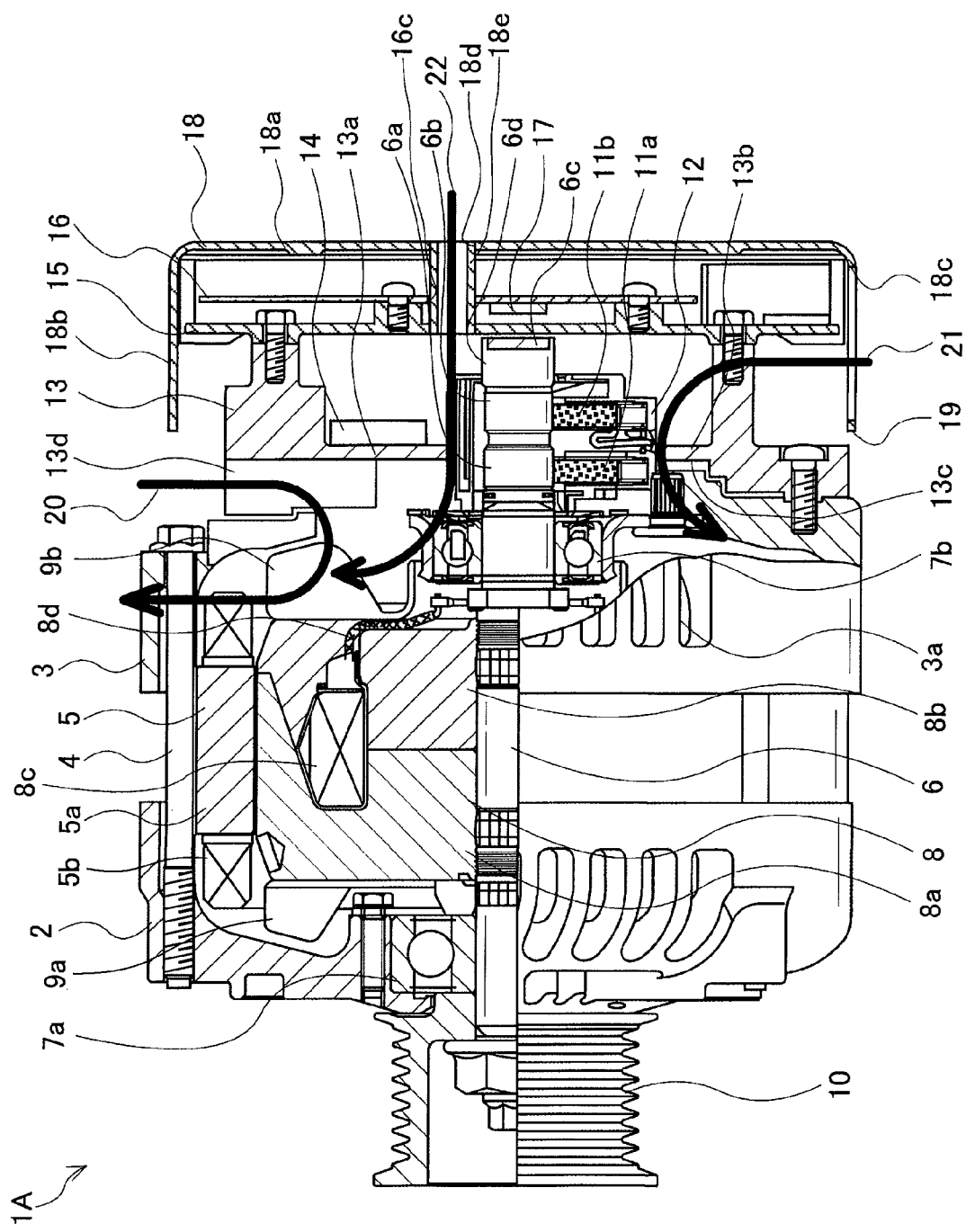
FIG. 3 shows a sectional view cut along the rotating shaft of the AC generator according to a second embodiment.

As shown in FIG. 3, a board passing hole 16c is disposed penetrating through the control board 16 of the AC generator 1A.

Figure 4:
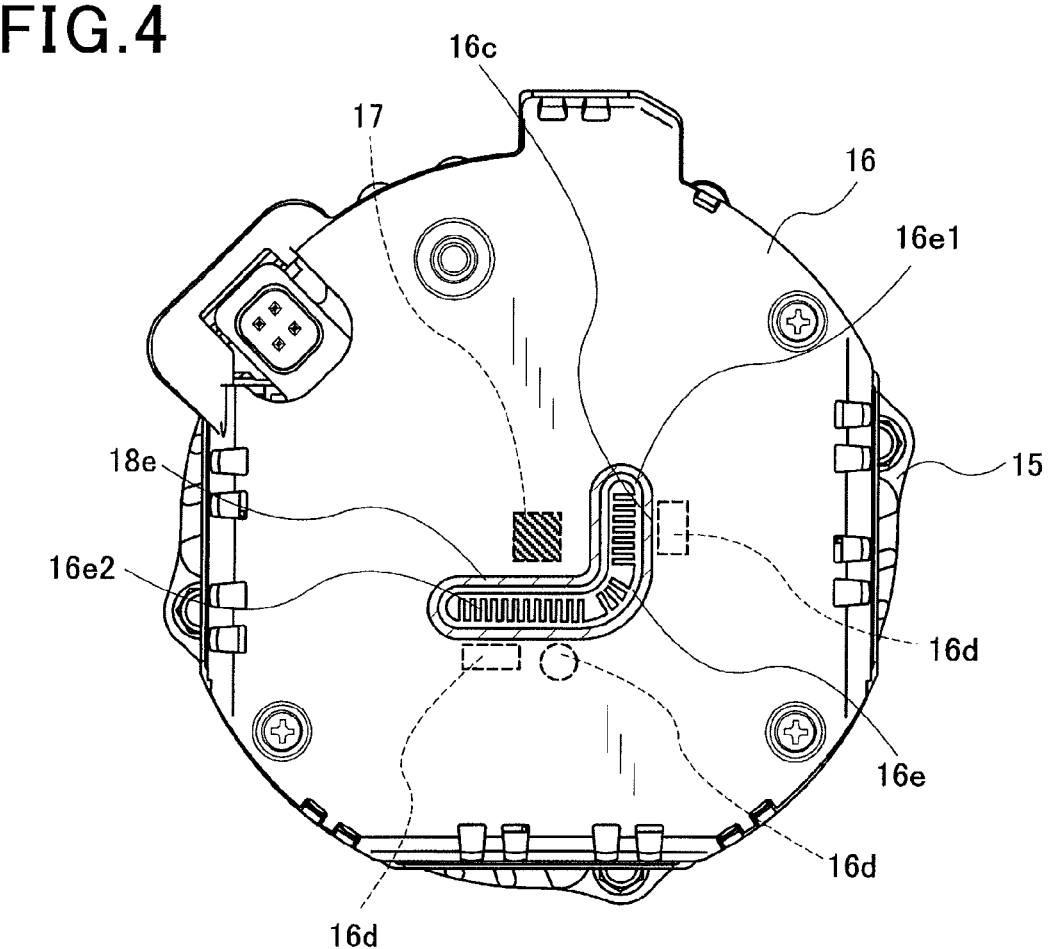
FIG. 4 shows a front view of a control board shown in FIG. 3 when viewed from a rear.

The board passing hole 16c is formed on a substantially central portion of the control board 16 (however, a position where the rotation sensor 17 is disposed is avoided), and has a substantially L-shape (refer to FIG. 4).

A plurality of electronic components 16d that forms the rotation sensor 17 and the control circuit 16a described above are disposed around the board passing hole 16c.

On the other hand, as shown in FIG. 3, the rear end cover 18 according to the present embodiment includes a cover air hole 18d so as to face the board passing hole 16c of the control board 16.

The cover air hole 18d is disposed penetrating in the axial direction in the flat portion 18a of the rear end cover 18.

It is preferable that an opening area of the cover air hole 18d is larger than the board passing hole 16c so as not to reduce the cooling air passing through the board passing hole 16c.

An annular passage wall portion 18e is disposed extending in the axial direction from the rear end cover 18.

The passage wall portion 18e is fitted with the cover air hole 18d and the board passing holes 16c, and penetrates the board case 15.

A space sandwiched between the rear end cover 18 and the board case 15 is blocked from an inner periphery of the passage wall portion 18e by the passage wall portion 18e.

Moreover, a hole fin 16e formed by a metal having excellent thermal conductivity such as an aluminum alloy is attached to the board passing hole 16c described above.

Figure 5:
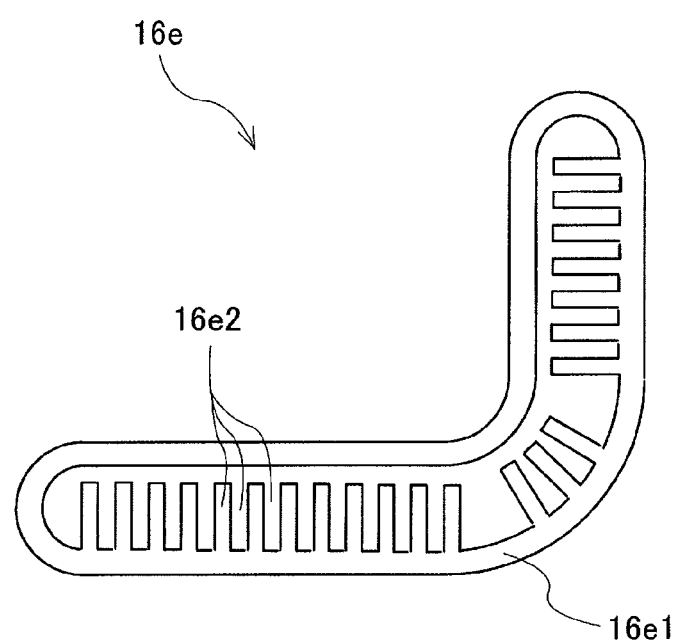
FIG. 5 shows an enlarged view of hole fin shown in FIG. 4.

As shown in FIG. 5, the hole fin 16e is formed in a substantially L-shape so as to correspond to the shape of the board passing hole 16c.

In order to increase a heat radiating area, the hole fin 16e includes a frame 16e1 of which a periphery is surrounded by the board passing hole 16c and is fitted to the board passing hole 16c through the passage wall portion 18e, and a plurality of teeth 16e2 projecting inwardly from the frame 16e.

Figure 6:
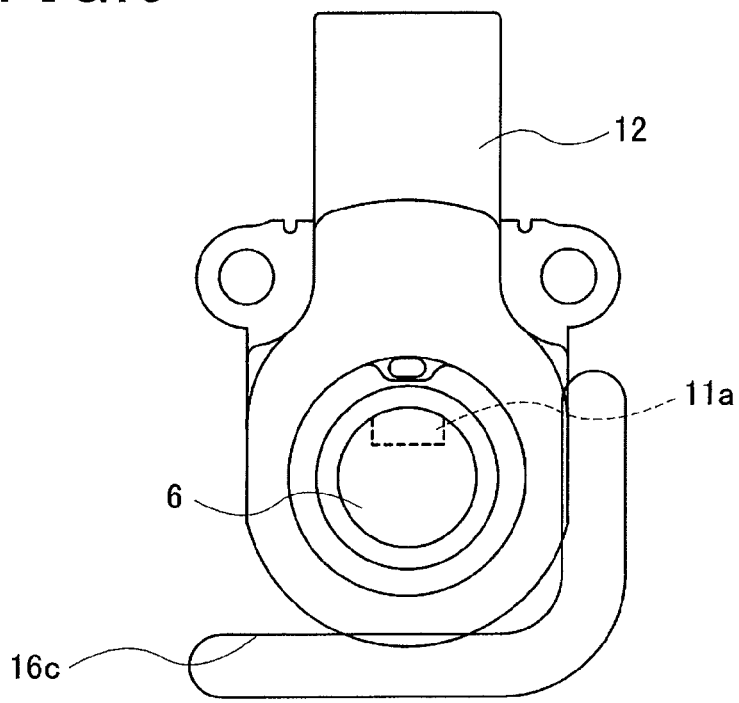
FIG. 6 shows a simplified diagram of a positional relationship between a board passing hole and a brush holder shown in FIG. 4.

As shown in FIG. 6, the L-shaped board passing hole 16c is disposed so as to match an outer periphery of the brush holder 12 holding the feeding brushes 11a, 11b.

Thereby, the cooling air flowing in from the board passing hole 16c can sufficiently cool the feeding brushes 11a, 11b via the brush holder 12.

Figure 7:
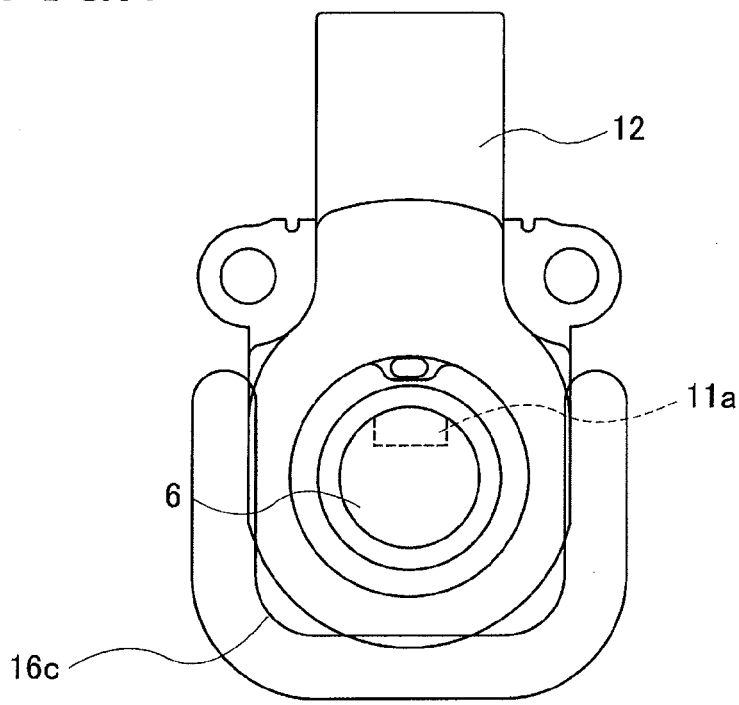
FIG. 7 shows a simplified diagram of a positional relationship between a board passing hole and the brush holder according to a modification.

As shown in FIG. 7, as a modified example, the board passing hole 16c may be formed in a substantially bracket (]) shape to match the outer periphery of the brush holder 12.

In this case, it is possible to further increase the cooling air supplied to the feeding brushes 11a, 11b and the rotation sensor 17.

As shown in FIG. 3, even in the AC generator 1A of the present embodiment, the first air passage 20 and the second air passage 21 are formed as in the case of the first embodiment.

In the AC generator 1A of the present embodiment, the cooling air passes through the cover air hole 18d and the board passing hole 16c, and flows into the AC generator 1A through the inner periphery of the passage wall portion 18e.

Then, the cooling air passes around the brush holder 12 and the rear end portion of the rotating shaft 6, and advances toward the front in the axial direction.

The cooling air flowed into the rear body 3 cools the stator coil 5b as well as the cooling air passing through the first air passage 20, and is discharged to the outside from the exhaust port 3a (a third air passage 22).

When the cooling air flowing in from the cover air hole 18d and the board passing hole 16c is passing around the rear end of the rotating shaft 6, the heat radiation is promoted from the feeding brushes 11a, 11b, the rotation sensor 17, and the sensor pole 6c.

According to the present embodiment, the board passing hole 16c penetrates the central portion of the control board 16.

The cover air hole 18d penetrates the rear end cover 18 so as to face the board passing hole 16c.

The rotation sensor 17 is disposed on the control board 16 around the board passing hole 16c.

The third air passage 22 is formed to the rear end cover 18 so that after passing through the cover air hole 18d and the board passing hole 16c, the cooling air is able to advance toward the front in the axial direction.

Thereby, in addition to the cooling air passing through the second air passage 21, it becomes possible to further cool the feeding brushes 11a, 11b and the rotation sensor 17 by the cooling air flowing along the third air passage 22.

In particular, since the third air passage 22 is provided in addition to the first air passage 20 and the second air passage 21, it is not necessary to increase the amount of cooling air passing through the third air passage 22, so that the size of the board passing hole 16c can also be made relatively small.

Therefore, this arrangement allows the disposition of the rotation sensor 17 to the central portion of the control board 16.

Moreover, the hole fin 16e is attached to the board passing hole 16c, and the hole fin 16e includes the frame 16e1 to be fitted to the board passing hole 16c, and the plurality of teeth 16e2 projecting inwardly from the frame 16e1.

This makes it possible to increase the heat radiating area of the hole fin 16e, and it is possible to improve the coolability of the rotation sensor 17 attached to the control board 16.

Further, on the control board 16, by disposing the electronic components 16d around the board passing hole 16c, it also becomes possible to cool the electronic components 16d in addition to the rotation sensor 17 by the cooling air passing through the board passing holes 16c.

Moreover, by being formed in the L-shape, the board passing hole 16c makes it possible to dispose the rotation sensor 17 and the electronic components 16d around the board passing hole 16c without interfering with the flow of cooling air, and it becomes possible to improve the coolability of the rotation sensor 17 and the electronic components 16d.

Further, by being formed in the bracket (]) shape, the board passing hole 16c makes it possible to dispose the rotation sensor 17 and the electronic components 16d around the board passing hole 16c, and it is possible further to increase the cooling air that passes through the control board 16, so that it becomes possible to further improve the coolability of the rotation sensor 17 and the electronic components 16d.

Other Embodiments

The present disclosure is not limited to the above embodiments and may be modified or extended as follows.

In FIGS. 6 and 7, the board passing hole 16c may be in a position inverted either vertically or horizontally, or may be in a position inverted both vertically and horizontally with respect to the brush holder 12.

The present disclosure is also applicable to an electric motor that drives the rotor 8 by supplying power converted to the AC by the power module 14 to the stator 5.

Moreover, the present disclosure is also applicable to a motor generator having both functions of a generator and a motor.

Further, the present disclosure is applicable not limited only to a rotating electrical machine for use in a vehicle, but is also applicable to a rotating electrical machine for use in home appliances or a rotating electrical machine for use in general industrial machineries.

What is claimed is:

1. A rotating electrical machine comprising:
    a housing;
    a stator fixed to the housing;
    a rotating shaft attached rotatable relative to the housing;
    a rotor, fixed to the rotating shaft, which faces the stator in a radial direction;
    a feeding brush attached to the housing for supplying power to the rotor by slide-contacting against a slip ring disposed on a first end portion of the rotating shaft;
    a power conversion element that converts power generated in the stator into direct current, or converts the power supplied to the stator into alternating current;
    a flat-plate shaped heat radiating member having a first surface and a second surface, the first surface is disposed closer to the first end portion side of the rotating shaft than to the housing so as to face the housing, heat radiation fins being formed on the first surface, and the power conversion element being attached to the second surface;
    a control board disposed on the second surface side of the heat radiating member;
    a rotation sensor attached to the control board that faces a magnetic pole that is disposed in the first end portion of the rotating shaft; and
    a rear cover disposed at a position sandwiching the control board together with the heat radiating member so as to cover the control board, and an outer periphery of the rear cover faces an outer peripheral surface of the housing in an axial direction with a predetermined space therebetween; wherein,
    there is formed a first air passage that enables external air to flow in from between the housing and the rear cover and to advance in a radially inward direction after passing through the heat radiation fins; and
    a second air passage that enables the external air to pass through and around the first end portion of the rotating shaft after flowing into the second surface side of the heat radiating member from a radially outward direction.

2. The rotating electrical machine according to claim 1, wherein,
    at least in one of the first air passage and the second air passage, after flowing in the radially inward direction, the external air advances toward a second end portion side of the rotating shaft, and is discharged to an outside from an exhaust port disposed in the housing.

3. The rotating electrical machine according to claim 2, wherein,
    the rear cover has a flat portion that faces the control board, and a cylindrical portion that is connected with the flat portion and extends in the second end portion side of the rotating shaft; and an air inlet hole penetrating in the radial direction is formed on the cylindrical portion.

4. The rotating electrical machine according to claim 3, wherein, in the second air passage, after flowing in the radially inward direction, the external air advances toward the second end portion side of the rotating shaft, and is discharged to the outside from the exhaust port disposed in the housing; and the feeding brush is disposed closer to the second end portion side of the rotating shaft than to the air inlet hole.

5. The rotating electrical machine according to claim 2, wherein, a board passing hole is disposed penetrating through a central portion of the control board while a cover air hole is disposed penetrating through the rear cover so as to face the board passing hole;

the rotation sensor is disposed on the control board around the board passing hole; and a third air passage is formed so that after passing through the cover air hole and the board passing hole, the external air is able to advance toward the second end portion side of the rotating shaft.

6. The rotating electrical machine according to claim 5, wherein, a hole fin is attached to the board passing holes; and the hole fin has a frame fitted to the board passing hole and a plurality of teeth protruding inwardly from the frame.

7. The rotating electrical machine according to claim 5, wherein, electronic components are disposed on the control board around the board passing hole.

8. The rotating electrical machine according to claim 5, wherein, the board passing hole is formed in an L-shape.

9. The rotating electrical machine according to claim 5, wherein, the board passing hole is formed in a bracket shape.

* * * * *